United States Patent
Campfield

(10) Patent No.: US 8,268,104 B1
(45) Date of Patent: Sep. 18, 2012

(54) METHODS OF USING UV CURING CATIONIC EPOXY FOR WINDSHIELD REPAIR

(75) Inventor: Richard A. Campfield, Grand Junction, CO (US)

(73) Assignee: Hybrid Windshield Repair, LLC, Grand Junction, CO (US)

( * ) Notice: Subject to any disclaimer, the term of this patent is extended or adjusted under 35 U.S.C. 154(b) by 640 days.

(21) Appl. No.: 12/410,434

(22) Filed: Mar. 24, 2009

Related U.S. Application Data

(60) Provisional application No. 61/070,591, filed on Mar. 24, 2008.

(51) Int. Cl.
  *B29C 73/00* (2006.01)
  *B29C 65/00* (2006.01)
  *B29C 35/08* (2006.01)
  *B32B 43/00* (2006.01)
  *B32B 37/00* (2006.01)
  *B32B 38/04* (2006.01)
  *C09J 163/00* (2006.01)

(52) U.S. Cl. ....... 156/94; 156/275.5; 156/330; 264/494; 264/36.21; 264/36.22

(58) Field of Classification Search ............ 156/60, 156/94, 99, 101, 104, 105, 242, 244.11, 244.21, 156/244.24, 272.2, 273.7, 275.5, 285, 286, 156/325, 326, 327, 330; 250/492.1; 118/620, 118/641, 642; 264/1.1, 1.36, 1.38, 1.7, 405, 264/446, 447, 454, 459, 478, 494, 496, 36.1, 264/36.18, 36.21, 36.22, 500, 544, 552, 553, 264/571, 100; 425/11, 12, 13
See application file for complete search history.

(56) References Cited

U.S. PATENT DOCUMENTS

| | | | |
|---|---|---|---|
| 3,993,520 | A | 11/1976 | Werner et al. |
| 4,291,866 | A | 9/1981 | Petersen |
| 4,385,879 | A | 5/1983 | Wilkinson |
| 4,569,808 | A | 2/1986 | Smali |
| 4,744,841 | A | 5/1988 | Thomas |

(Continued)

OTHER PUBLICATIONS

Billmeyer, Fred W. Jr., Textbook of Polymer Science, 1984, John Wiley and Sons, Inc., United States.

(Continued)

*Primary Examiner* — Philip Tucker
*Assistant Examiner* — Brian R Slawski
(74) *Attorney, Agent, or Firm* — Lawrence S Cohen

(57) ABSTRACT

A method of using UV cationic epoxy to repair cracks and breaks windshields in order to eliminate oxygen inhibition and shrinkage. The method includes embodiments that employ pretreatment or priming of the of a crack or break in order to negate the moisture and PVB retardation of the UV cationic epoxy polymerization and mixing the UV cationic epoxy and a UV radical resin to create a hybrid or; adding other ingredients to the UV cationic epoxy to negate the moisture and PVB retardation; and use of the UV cationic epoxy as a cap over repair resin/epoxy and as a pit filler. Other combinations of materials and procedures are disclosed.

3 Claims, 6 Drawing Sheets

U.S. PATENT DOCUMENTS

| | | | |
|---|---|---|---|
| 4,775,305 A | 10/1988 | Alexander et al. | |
| 4,814,185 A | 3/1989 | Jones | |
| 4,820,148 A | 4/1989 | Anderson | |
| 4,919,602 A | 4/1990 | Janszen | |
| 5,116,441 A | 5/1992 | Campfield, Jr. | |
| 5,425,827 A | 6/1995 | Campfield | |
| 5,429,692 A | 7/1995 | Campfield | |
| 5,512,116 A | 4/1996 | Campfield | |
| 5,589,018 A | 12/1996 | Campfield | |
| 5,614,046 A | 3/1997 | Campfield | |
| 5,653,497 A | 8/1997 | Campfield et al. | |
| 5,860,689 A | 1/1999 | Campfield et al. | |
| 6,033,507 A * | 3/2000 | Campfield | 156/94 |
| 6,187,124 B1 | 2/2001 | Campfield | |
| 2007/0092733 A1 * | 4/2007 | Yang et al. | 428/413 |
| 2008/0044149 A1 * | 2/2008 | Kanno et al. | 385/123 |

OTHER PUBLICATIONS

Petrie, Edward. Cationic UV Cured Epoxy Adhesives, Apr. 6, 2005 Accessed on Mar. 20, 2009, http://www.specialchem4adhesives.com/resources/articles/.

Petrie, Edward. Epoxy Adhesive Formulations, 2006, pp. 259, 263-264, The McGraw-Hill Companies, Inc., New York.

UV Cure 60-7156 Flexible UV Curable Adhesive & Potting Compound, Accessed on Mar. 21, 2009, http://www.epoxies.com/tech/60-7156R.pdf.

UVACURE Cationic UV-Curable Resins. Accessed on Mar. 12, 2009. http://www.cytec.com/uv/Downloads/Graphic%20Arts%20-%20UVACURE%20-%20Cationic%20UV-Curable%20Resins_EMEA_En.p.

* cited by examiner

METHODS OF USING UV CURING CATIONIC EPOXY FOR WINDSHIELD REPAIR

RELATED APPLICATIONS

This application is related to provisional application Ser. No. 61/070,591 Filed on Mar., 24, 2008 the priority benefit of which is claimed and the content of which is incorporated herein by reference.

TECHNICAL FIELD

The present invention pertains to methods for the repair of windshield breaks and cracks.

BACKGROUND

Background art is found in U.S. Pat. Nos. 5,116,441; 5,425,827; 5,429,692; 5,512,116; 5,589,018; 5,614,046; 5,653,497; 5,860,689; 6,033,507 and 6,187,124. all of whose content is incorporated herein by reference.

Various adhesive products are commercially available in the adhesive industry. Many of which cannot and are not used for windshield repair because of issues in their curing process, weatherability, strength, color, clarity and viscosity. In the trade for the repair of automobile windshield breaks and cracks all of the known adhesive/resins in use today fall under the category of UV curing free radical acrylics. In this description and claims the terms "UV curing free radical acrylic resin" and "UV radical" and "UV radical acrylic" and "UV radical resin" and similar terms known in the art to have essentially the same meaning may be used interchangeably. The practicality of an acceptable windshield repair is based on several important factors which include that the index of refraction of the resin is substantially the same as that of the glass, that the bond is able to restore the structural integrity of the glass and will seal the laminate from the atmosphere and will prevent the damage from spreading.

A crack or break in glass is visible, referred to as refraction, because as light rays pass the boundary between the glass and the air in the crack, they are refracted or bent. Light that is reflected back from such boundaries comes at a different angle than if there were no crack and hence the eyes and brain of the observer sense the discontinuity. If two materials have the same index of refraction there will be no bending of the light rays at a boundary between the materials and an observer will not sense the discontinuity. Thus a crack filled with a resin that has the same index of refraction as the glass will essentially seem to disappear except for what is referred to as the "Head-On Angle" which is a hairline. The profile of the crack is the side view of the crack and this view is the angle in which the crack will virtually disappear. The head-on angle is just that and this angle is always visible. For example the head-on angle of a horizontal crack can be seen by lying down on the seat. Fortunately most long cracks run horizontally and that is why they are not visible from the normal sitting position but a star break or combination break will have different head-on angles for each crack within the break and this will be of concern when it is in the acute area in front of the driver.

There are different types of clear adhesives. Some are aerobic or "air drying", anaerobic, two-part and others are cured or hardened by radiating them with ultraviolet light (UV) which is usually provided by a lamp made for this purpose. The windshield repair industry currently uses free radical UV curing resins ("UV radical resins") that are also anaerobic (oxygen inhibited) with acrylic or acrylate components exclusively.

Aerobic resins come in two parts and are mixed before their use. Their curing begins from the time of mixing whereas the cure of the ultraviolet types begins when they are subjected to the ultraviolet light. Two-part resins were tried in earlier years but were discontinued because of the lack of control of the cure. The advantages of UV curing is that the curing process is able to be controlled so that it can begin when the technician has totally filled the break or crack with the resin. The time to completely fill the break or crack can vary depending upon the break or crack, from a couple of minutes to over thirty minutes. The aerobic resins may commence to cure before the technician is finished and ruin the repair. Therefore the windshield repair industry, which began in the mid 1970s, has adopted UV curing as the most efficient method and the type of UV curing has been free radical and the resin is and has been acrylic. Another type of UV curing adhesive, that has not been used by the windshield repair industry, is cationic epoxy mainly because the viscosity is too high to fit into a stone break. The viscosities for cracks are discussed in U.S. Pat. No. 5,116,441 and CIPs to Campfield. Generally another problem is that the polymerization is retarded by moisture.

Automobile windshields are made of a "sandwich" of two layers of glass laminated to an inner layer of material called polyvinylbutyral (PVB). The glass area for each layer has an exposed surface and an inner surface in contact with the inner plastic (PVB) layer. The outside glass layer is called the "outerlite" and the inside glass layer is called the "innerlite" and the laminate is called the interlayer.

There are two broad categories of breaks or cracks in windshields that occur to the outerlite. One category is called a "stone-break" and the other is called a crack, usually a long crack i.e. over six inches. These are shown schematically in FIG. 1, in which 1a is a stone break, 1b is a long crack of the floater type and 1c is an edge crack. These are described in more detail below.

Stone-Breaks

Stone breaks are seen as small breaks with a chip on the surface of the glass and are called a bullseye, a star-break, a combination bullseye and star break, and sometimes as variants on these configurations. It is well known that stone breaks are "un-surfaced" that is they extend below the surface of the glass and are actually on the inside of the outerlite against the PVB. Repair methods and equipment employ application of vacuum at an entry location which is the impact spot which caused the damage, followed by injection of resin under pressure to flow into the break. This is called "stone damage art". In this manner, the resin replaces the air in the break.

Various tools have been proposed to aid in filling stone breaks with resin. One is described in U.S. Pat. No. 3,993,520 to Werner and utilizes an injector assembly having a piston inside a cylinder. Another is described in U.S. Pat. No. 5,512,116 to Campfield. When the piston is depressed the resin is injected out the open end of the cylinder and into the stone break. The assembly is held to the surface of the glass by suction cups. A similar apparatus with an adjustable arm is disclosed in U.S. Pat. No. 4,291,866 to Petersen. A variation of the Werner apparatus is in U.S. Pat. No. 4,569,808 to Smali while U.S. Pat. No. 4,744,841 to Thomas utilizes vibration and heat. An apparatus with a spring loaded air exit is disclosed in U.S. Pat. No. 4,775,305 to Alexander and U.S. Pat. No. 4,814,185 to Jones has a side tube for introduction of the resin. The use of vacuum to aid the resin injection is explored in U.S. Pat. No. 4,820,148 to Anderson and U.S. Pat. No.

4,919,602 to Janszen. Other related patents are U.S. Pat. No. 4,419,305 to Matles and U.S. Pat. No. 4,385,879 to Wilkinson For a normal bullseye type stone break approximately 1 cc of low viscosity resin is needed. This is equivalent to 3-4 drops of resin, an amount sufficient to repair most stone breaks. Most stone breaks are repaired with resin in the viscosity range of 15-40 cps with 20 cps being the most popular.

Stone-breaks must be cured with the injector in the pressure mode with UV curing free radical acrylate resins in order to compensate for the shrinkage which can be as high as 20% to 30%. If it is not cured under pressure there will be a void in the middle due to the shrinkage and it will refract. The acrylic resin has a poor bond to the PVB. It has a bond to the glass and the glass will expand and contract from temperature change and the PVB will change from stiff to soft from temperature change. Consequently the resin can separate from the PVB eventually and cause a miniscule gap between the resin and the PVB that will refract, which is a cosmetic blemish. This will happen with un-garaged vehicles more so than with garaged vehicles.

After the stone break has been cured under pressure then the pit or chip on the surface must be filled with a drop of resin referred to as "pit filler" and the process referred to as 'filling the pit'. Mylar film is placed on top of the pit and it is cured, i.e. a second curing. Often the resin has cured around the seal of the injector while curing under pressure and this must first be removed before the pit resin and Mylar tab are placed on the surface. After the pit resin is cured there is excess resin around the pit and it is scraped off with a razor blade and the pit which was clear is now opaque or white, which now requires another messy process of "polishing the pit".

Cracks

There are two types of cracks, a floater crack and an edge crack and these cracks are referred to as a "short crack", 6-inches or less and a "long crack", which is over six-inches in length. These are clearly distinguished in the field as noted in the patents listed above. Prior to U.S. Pat. No. 5,116,441 to Campfield and continuations in part, the windshield repair industry did not repair long cracks because it was understood that the resin could not withstand the stress. This was true because repairs were made using one low viscosity acrylic and these resin's strength and durability comes from the thicker ingredient oligomer. Low viscosity resins are low in oligomer and higher in monomer. U.S. Pat. No. 5,116,441 and CIPs to Campfield solved this problem by injecting the thickest acrylic resins possible into the crack, which ended up being two or more viscosities (usually three) being injected into a crack from the surface. This method is referred to as the "multi-viscosity method" is licensed to many businesses and is known today as the best and only reliable method in the industry. This method uses UV curing free radical acrylic resins.

The floater crack is a stone-break that elongated into a floater crack from temperature change, such as a defroster on a cold day or a car wash on a hot day. Over 90% of stone-breaks will never crack and that is why only 10% of repaired cracks are floater cracks.

The floater crack is called a floater crack because it has not run to the edge and is floating in the middle section of the windshield. The floater crack is tight because the lamination stress is pulling it together. This crack will have two points and is repaired by drilling in front of each point, tapping a small bullseye and placing a repair tool at each one with a resin of low viscosity (20-45 cps). Crack openers will be placed on the inside to pry open the crack. Then another tool will be slid along the surface of the crack injecting a medium viscosity resin, of 200 cps. After the crack is completely filled with resin and has no spots, a bead of resin is placed on the surface of the crack and then Mylar tabs or strips are placed on top of the resin to remove access to oxygen and prevent oxygen inhibition of the curing process. The tools at the points are kept in place and then the first curing cycle is done. The tools at the points are left in the pressure mode to compensate for the shrinkage of the acrylic resin and the Mylar is to address the oxygen inhibition of the resin. After the resin has been cured the tools at the points are removed, Mylar is placed over the drilled holes and another cured is done. After the second curing the Mylar strips are removed, resin is scraped off the windshield and the mess is cleaned up. The Mylar tabs or strips will be a mess and will be wiped off or placed in a jar of alcohol so they can be cleaned and used again or they are thrown out.

The edge crack is 90% of repairable cracks and 95% of edge cracks will be long cracks (over six inches). The edge crack is also the cause of approximately 80% of windshield replacements, see U.S. Pat. No. 5,653,497 to Campfield. The reason for this is a manufacturing quality which is considered a defect around the perimeter in the context of windshield damage. The first two inches around the perimeter has residual stress of about 1,000 psi from the bending and annealing process, with an original equipment windshield and over 1,000 psi on auto replacement glass (ARG) or after market windshields. This area fractures 2.5 times easier than the rest of the windshield. The second defect goes approximately 4 inches from the edge and is called induced or installation stress incurred from gluing the windshield to the vehicle. This causes a fracture in the residual stress area to crack immediately to the edge to relieve the induced stress and causes a gap at the edge of 0.0001 to 0.005. This gap is then closed by the lamination stress pulling the crack back together at around 10-12 inches from the edge. FIG. 2 schematically shows the gap of an edge crack in which $2a$ is the residual stress area and $2b$ is the induced stress area and $2c$ is the impact point now on each side of the crack. The gap and stress is why an edge crack must be repaired with multiple viscosity acrylic resins. This is also why 95% of edge cracks are long cracks or over six inches. The edge crack, which is almost always a long crack could not be successfully repaired by the windshield repair industry until inventions in U.S. Pat. No. 5,116,441 and CIPs. This was because the installation stress ranges from 1,000 to 3,000 psi and the windshield then standard low viscosity UV curing free radical acrylic resin did not have sufficient cohesive strength and shrunk upon curing which caused residual stress within the cured resin. This crack at one end is through to the edge and at the other end (in the middle section) is called the point and is repaired by drilling in front of the point, tapping a small bullseye and placing a repair tool at the point with a resin of low viscosity (20-90 cps). Crack openers will be placed on the inside to pry open the crack near the point and another tool will be mounted butted up to this tool with a medium viscosity resin of 200-400 cps. Another tool or just an injector held in the hand injects the edge crack resin, usually 1600 cps starting at the edge and going in toward the middle injections as far as it will go until the lamination stress pulls the crack tighter and tighter as is goes toward the point. The second tool with the medium resin is then slid to where the edge crack resin (1600 cps) stopped. A bead of resin is then placed on the surface of the crack and then Mylar tabs or strips are placed on top of resin to remove access to oxygen. The tool at the point is kept in place and then the first curing cycle is done. The tool at the point is left in the pressure mode to compensate for the shrinkage of the acrylic resin and the Mylar is to address the oxygen inhibition of the resin. After the resin has been cured the tool at the point is removed and Mylar is placed over the drilled hole and cured again. After the second curing the Mylar strips are removed, resin is scraped off the windshield and the mess is cleaned up. The Mylar tabs or strips will be a sticky mess and will be wiped off or placed in a jar of alcohol so they can be cleaned and used again or are thrown out. This is the most successful method to repair the edge crack today with three UV curing free radical acrylic resins, a 45-90 cps at the point, a 200-400 cps in the middle and a 1600-2400 cps at the edge area. The edge area with the induced stress (first four inches) is primed with a 45 cps resin when the glass is cold for wetting purposes.

Any air bubbles or voids in the repair prior to curing will upon curing go to the bottom along the laminate as the resin is crosslinking to itself and the glass. This spot which can start out as a centimeter becomes what is called a "runner" because it does just that, it runs for inches along PVB. It is a gap between the laminate and the cured resin. This will be seen after the repair is cured and the technician then does the process of removing a runner by drilling along side the crack in the middle of the runner which can be one to five inches long if too low of a viscosity was used.

The tabbing with Mylar can cause problems with air bubbles, especially when they are continually being reused and are dirty or bent. Because of the oxygen inhibition the air bubbles will cause a void and short chain links in the cross linkage of the radical cured acrylic resins which compromises the repair and results in a "sticky" surface of the resin. Using a "meet in the middle" method to try to eliminate one of the curing cycles (at the point) by using a 200 cps and 1600 cps resin where the 200 cps resin is placed at the point over the drilled hole and a mini bullseye tapped and then the 1600 cps at the edge is slid toward the middle until it stops somewhere in the middle. Then the 200 cps is slid to where the 1600 cps stopped, tools removed and then the crack is tabbed with Mylar and cured once. But this method leaves a void in the bullseye at the point because the tool with the 200 cps was not left on the point to cure under pressure and the 200 cps shrinkage causes a void that will refract and sometimes cause it to crack further from that imperfection. Sliding the 200 cps back to the drilled hole to cure under pressure would spot the crack. That is why the three resin method where one tool is placed at the point and left there through curing has been the most effective with the UV curing free radical acrylic resins. This method requires one or more crack openers on the inner-lite and three tools on the outerlite, one at the point, one butted up to the tool with the medium resin and one at the edge with the edge resin. The tool at the point needs to be 45 cps so it can flow past the second tool butted up to it with the medium resin and then that tool is slide to the middle where the edge resin, usually 1600 cps stopped.

The interlayer Poly Vinyl Butyral i.e. PVB Film is a mixture of PVB resin and a plasticizer. PVB interlayers are manufactured at, and glass is fabricated with, an interlayer moisture level between 0.30% and 0.50%. PVB interlayers are also hydroscopic, which means they absorb moisture. According to PVB manufactures PVB, within 15 minutes of the glass fracturing and exposing the PVB to the air, will absorb moisture at the site of the exposure of the PVB from the atmosphere with relative humidity levels as low as 30%. In essence the exposed PVB comes with an inherent moisture content and sucks in moisture like a vacuum.

Although windshield repair is currently highly successful there is always room for improvement in making the process more efficient, less toxic, and easier to do and to strive for perfection. Here are the problems that the current free radical has and the cationic solves with the following windshield repair applications or processes:

DESCRIPTION OF EMBODIMENTS OF THE INVENTION

Figure 1:
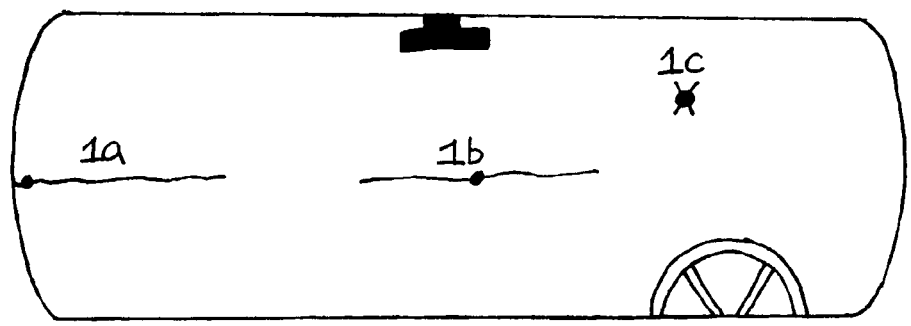
FIG. 1 is a schematic view showing a windshield with an edge crack 1a, a floater crack 1b and a stone break 1c.
Figure 2:
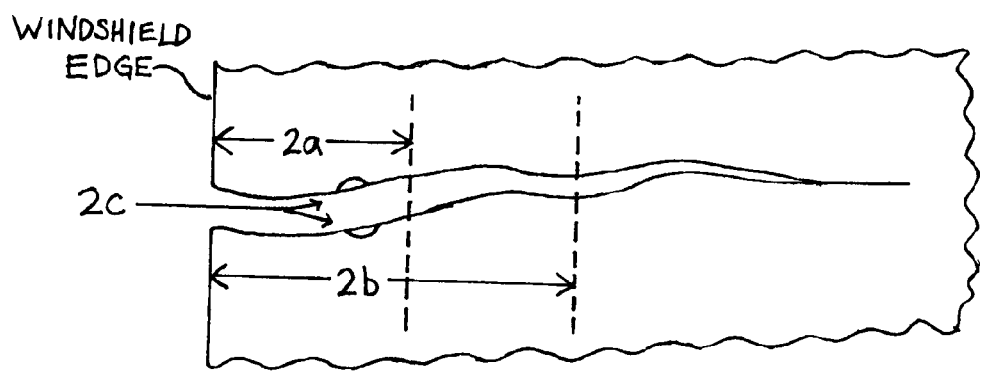
FIG. 2 is a schematic magnified top view of an edge crack illustrating the residual stress distance from the edge 2a, the induced stress distance from the edge 2b and the impact point 2c (now separated on each side of the crack). The first two inches from the edge is considered for purposes of windshield repair methods as the area where the residual stress is in the glass and similarly the first four inches is where the induced or installation stress in located. This induced stress causes the gap. Further along into the middle of the windshield the lamination will close the gap.
Figure 3:
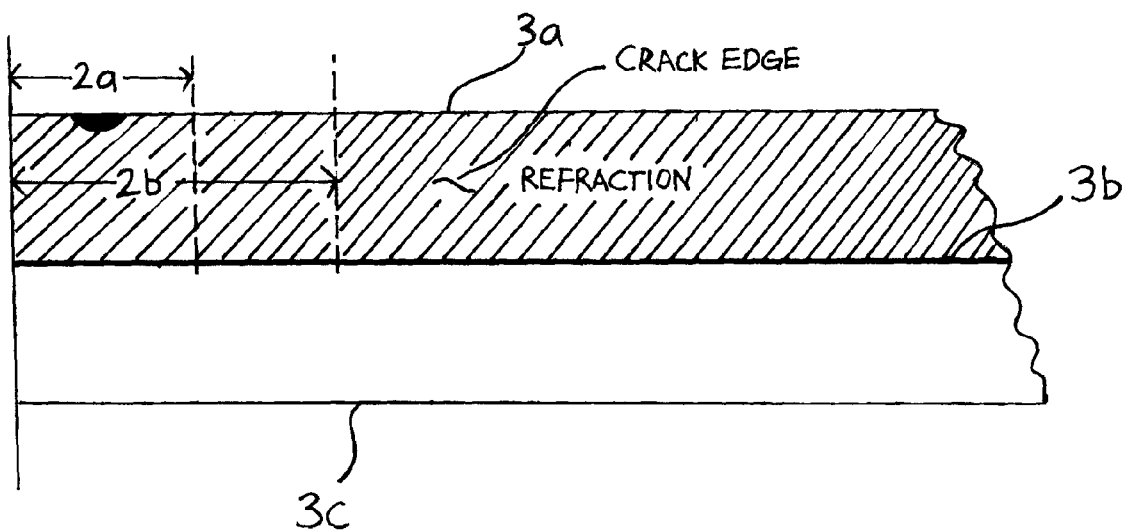
FIG. 3 is a schematic profile view of an edge crack before repair showing the residual stress distance 2a from the edge, the induced stress distance 2b from the edge the profile of the crack as the point narrows and goes unsurfaced.
Figure 4:
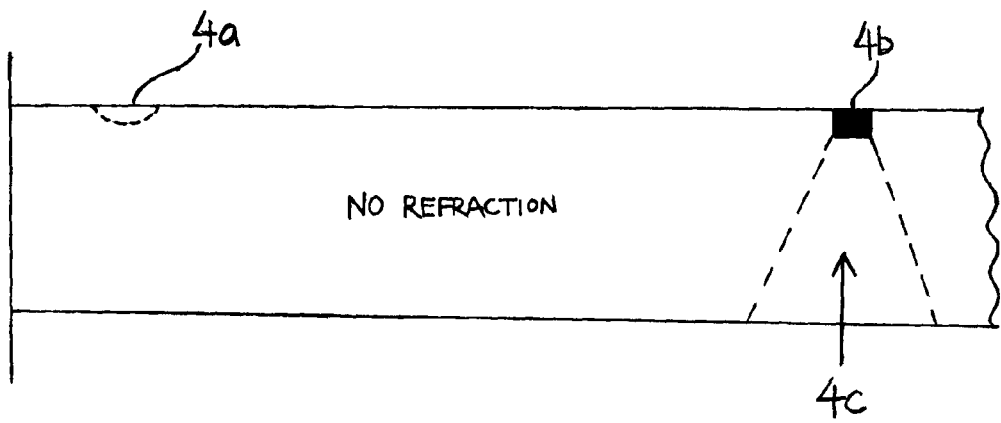
FIG. 4 is a schematic profile view of an edge crack after repair. It shows a properly repaired crack from the profile with the drill hole and tapped bullseye at the point.
Figure 5:
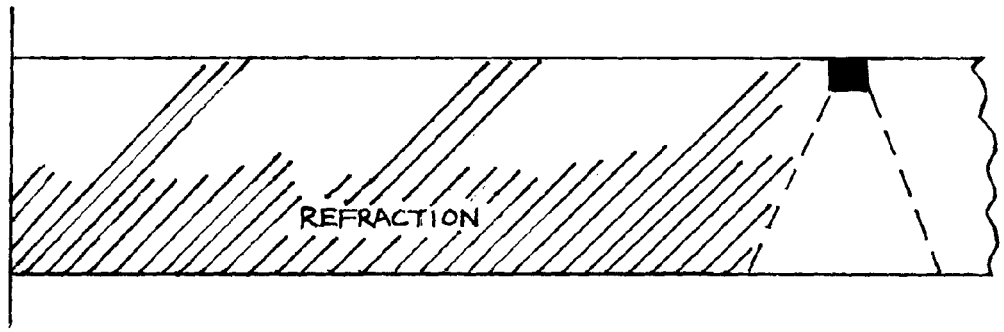
FIG. 5 is a schematic profile view of an edge crack repair using UV curing cationic epoxy alone with no primer, no pretreatment and no hybrid. Spots and refraction are shown with the diagonal lines
Figure 6:
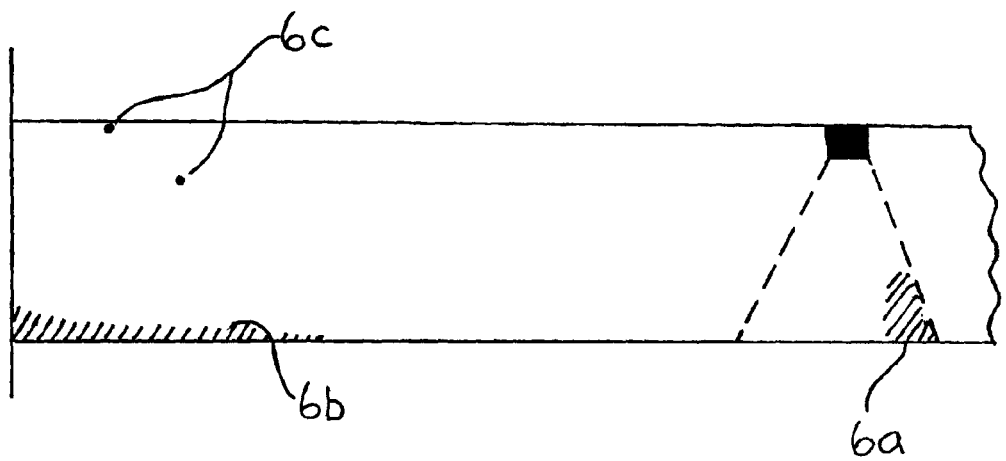
FIG. 6 is a schematic view of an edge crack repair using only a single medium viscosity e.g. 200 cps, UV curing free radical acrylic resin showing shrinkage 6b and void 6a defects in the repair.
Figure 7:
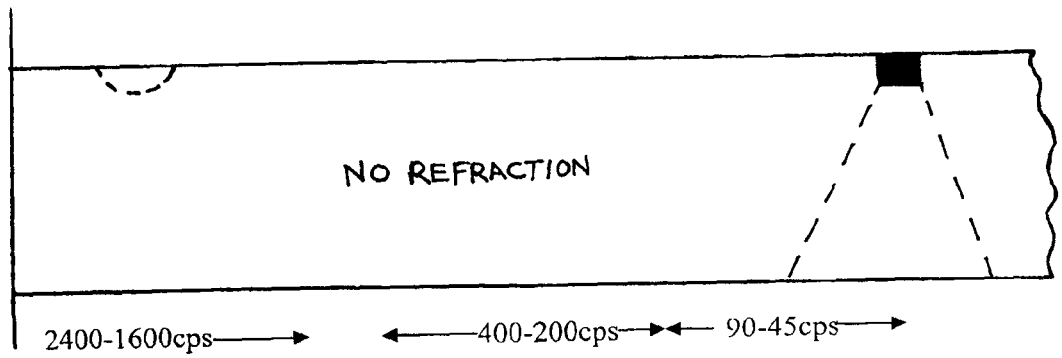
FIG. 7 is a schematic view of an edge crack repair of the prior art multi-viscosity UV radical acrylic resin method showing the use of three different vidscosities.
Figure 8:
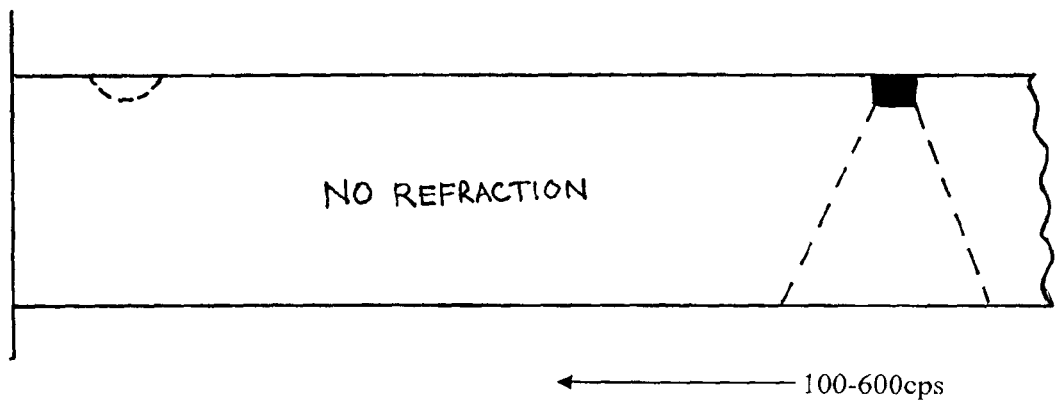
FIG. 8 is a schematic view of an edge crack of about 12 inches or less repaired with an embodiment of the invention in which a single viscosity of UV cationic epoxy has been used with either pretreatment or priming before injection of the UV cationic epoxy or in which a hybrid of UV cationic epoxy and UV radical acrylic resin has been used or a combination of pretreatment or priming and hybrid.
Figure 9:
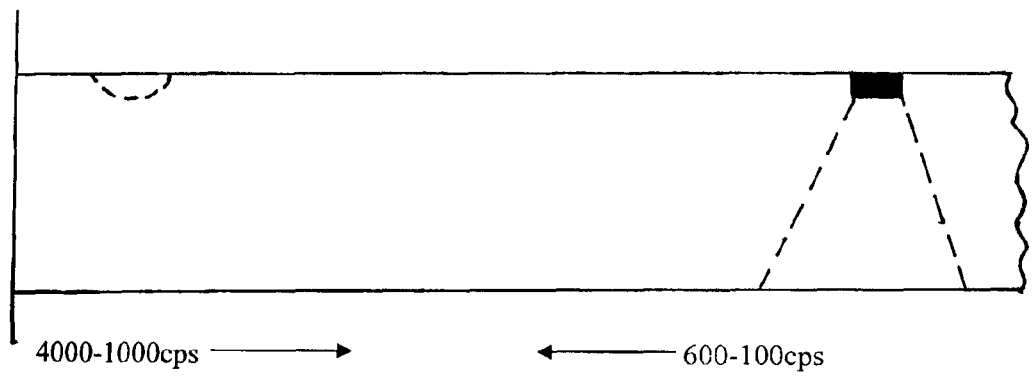
FIG. 9 is a schematic view of an edge crack over about 12 to 14 inches repaired with an optional second UV cationic epoxy or hybrid on edge cracks with a wider than normal gap at the edge, which is common with edge crack longer than 12-14 inches in which a high viscosity of about 4000 to 1000 cps is used in the widest part of the crack and a medium viscosity of about 600 to 100 cps is used in the narrower part of the crack.
Figure 10:
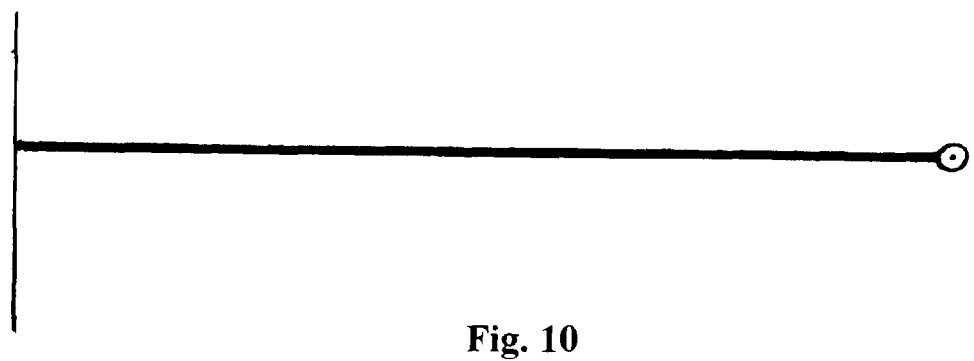
FIG. 10 is a schematic view of a head-on angle after a repair with UV radical acrylic resin.
Figure 11:
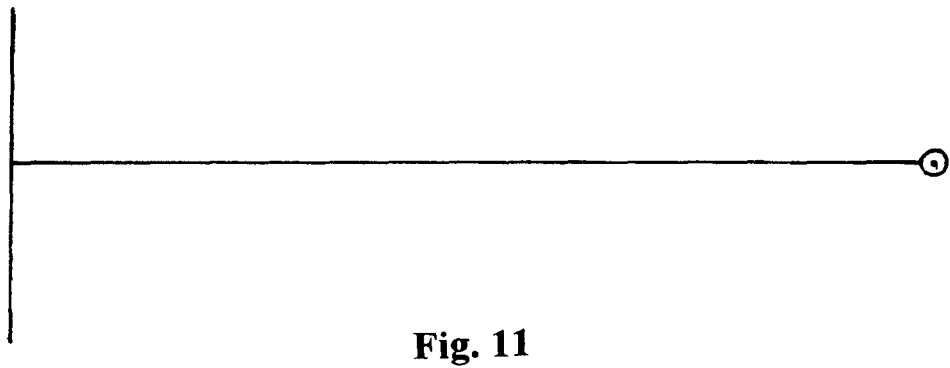
FIG. 11 is a schematic view showing the lesser and reduced visibility of the repair in a head-on angle after repair with UV cationic epoxy.
Figure 12:
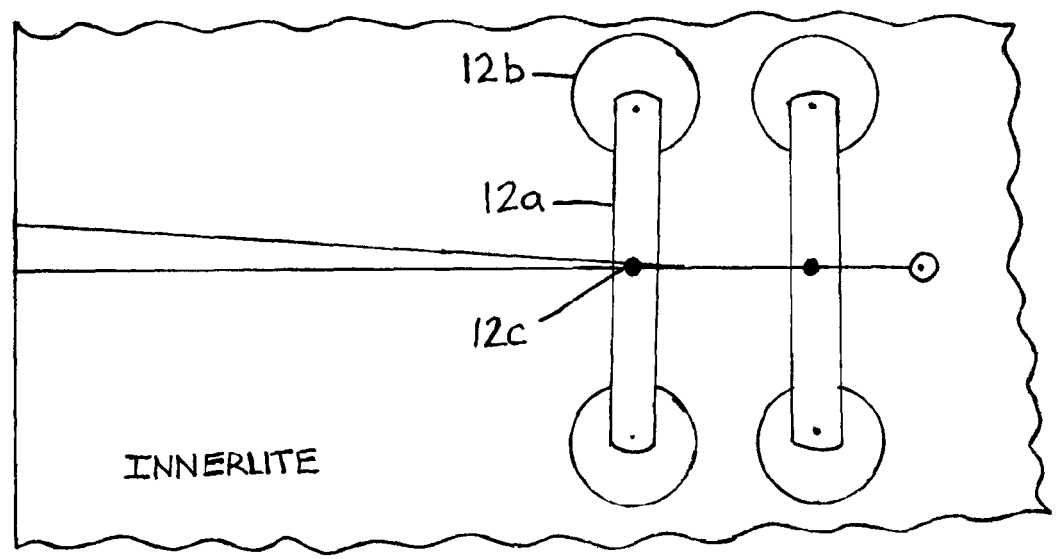
FIG. 12 is a schematic view from inside showing the use of larger and multiple crack openers on the innerlite to enable a higher viscosity UV cationic epoxy to be injected into the point.

Objectives of the invention for windshield repair are to: improve the adhesive bond of a windshield repair; eliminate oxygen inhibition; eliminate shrinkage; improve the appearance; eliminate steps in the process; save time; use a less toxic and hazardous adhesive; eliminate tools; eliminate runners; have the resin in an edge crack under the molding cure; eliminate multiple cures; make the process easier, eliminate and/or replace Mylar; make the process cleaner and faster for the technician and; eliminate waste.

Reference may be had to the drawings in the related portions of the following description as well as in the preceding background material.

As far as is known the windshield repair industry uses UV curing free radical acrylic resins exclusively for the repair of stone-breaks, pit filling, edge crack repair and floater crack repair. Those resins use acrylic or acrylate components, are oxygen inhibited and shrink upon curing. As a result a number of special and additional steps are required in the repair methods to avoid or mediate these problems such as the use of multiple viscosities for repairing edge cracks and floater cracks and the use of Mylar strips to avoid oxygen inhibition.

The present invention proceeds from in the discovery that UV curing cationic epoxies offer several advantages over the UV free radical resins. In this description and claims the terms "UV curing cationic epoxy", "UV cationic" and UV cationic epoxy" and similar terms known in the art to have essentially the same meaning may be used interchangeably In windshield repair these advantages greatly improve the windshield repair processes of pit filling, stone breaks, edge crack repair, and floater crack repair. However the UV cationic epoxies are sensitive to moisture and their use requires that any exposure to moisture be eliminated or at least significantly mediated.

Cationic cure mechanisms have been found to be an alternative approach to UV free radical curing. It has been found that the cationic process is not subject to oxygen inhibition as is the free radical mechanism. Cationic cure mechanisms provide less shrinkage and improved adhesion. Unlike free radical chemistry, cationic reactions continue after the UV light has been removed. These reactions also progressively penetrate into recessed areas inaccessible by line of sight to the radiation source. In this way cationic cured epoxy adhesive can be used effectively on substrates that have shadowed areas.

In the repair of edge and floater cracks using UV cationic epoxy, spots and voids can be consumed instead of becoming a "runner" by expansion of the UV cationic into the voids and spots.

However, it has been found that the UV cationic epoxy is sensitive to exposure to water, and moisture. It has also been found that the UV cationic epoxy does not attach well to the PVB laminate, although the reason is not clear, it may be that the PVB has moisture content or holds moisture or some other reason. Therefore in one embodiment of the invention, before injection of the UV cationic epoxy into the crack or break, it is treated with a pretreatment or with a primer, as described in more detail below to negate the effect of moisture on the UV cationic epoxy. In another embodiment the UV cationic epoxy is mixed with a UV radical resin also as described in more detail below.

Stone—Damage Repair

The repair of a stone break is done by an injector placed over the impact point with a structure holding it to the windshield. The injector is usually a sealed piston-cylinder filled with resin, which creates vacuum when the piston is raised and pressure when lowered. Once the break is filled the resin must be cured with the tool kept in the pressure mode to compensate for the shrinkage that will occur when curing. If the tool is removed or removed too soon the shrinkage will cause a void in the repair, which will refract and be visually imperfect. This problem of shrinkage is eliminated by the use of UV cationic epoxy. However, presently there is no UV cationic epoxy commercially available with a low enough viscosity to fit into a stone break. However additives, diluents, can lower the viscosity. Also, the UV cationic epoxy does not have to be cured under pressure because it does not shrink. The viscosity can also be lowered by making a hybrid of UV cationic epoxy and UV free radical acrylate resin.

Pit Filling

After a stone-break has been injected with UV free radical resin and cured under pressure the tool is removed and the pit is filled by placing a drop of pit filler adhesive in the impact point or chip and because the pit filler is oxygen inhibited Mylar must be placed on top of the adhesive and pressed down to remove exposure to the oxygen for curing. This causes the pit filler to spread beyond the perimeter of the chip. After it is cured the excess must be scraped off with a razor blade. This causes the clear pit to turn white. Now the pit must be polished, another messy process added to the job. This is done with pit polish and a polisher that has to be covered or it sprays polish everywhere and the end result is nowhere near as clear as it would have been had there been no scraping. Because the UV cationic epoxy is not oxygen inhibited the Mylar, scraping, and polishing is eliminated with a clearer pit for an end result. Time and work are also saved with a stone-break repair because there is only one curing cycle needed instead of two.

Edge Crack Repair

The edge crack is the only windshield repair that has mechanical stress and a gap. The edge crack is also the cause of most windshield replacements. Repairing this crack requires multiple viscosities with UV cured free radical acrylic resins whose strength and durability are ruled by the oligomer, because one end has a gap and stress and the other end has no gap and no stress. This crack must be injected with the thickest UV free radical resin possible to compensate for the shrinkage. It also requires multiple cures because the injecting tool at the point has to kept under pressure like the stone break repair to keep the resin under pressure while it is cured to account for the shrinkage. The use of multiple viscosities of UV free radical resins is the only edge crack repair method on the market today that works.

The edge of a windshield has two physical qualities which are considered defects in the context of damage by impact. One is manufacturing residual stress and installation or induced stress from gluing the windshield to the frame of the vehicle. The residual stress causes the first two inch area around the perimeter to fracture 2.5 times easier than the rest of the windshield. The induced or installation stress causes this fracture to crack to relieve the stress, usually 10-12 inches. The induced stress splits it apart at the edge and makes a gap 0.0001-0.005. The lamination stress then pulls the crack back together. In this repair using UV radical resins requires multiple viscosities to add strength to hold the stress, fill the gap and to minimize the shrinkage which can cause the resin to separate off the laminate when it cures. The shrinkage can cause a thin line of refraction and another repair process must be performed called "removing a runner", which is more work and more time.

In the present invention, use of the UV cationic, avoids the shrinkage problem and the complex steps that are needed to prevent or mediate shrinkage. Using the UV cationic, in the repair of edge and floater cracks spots and voids are consumed instead of becoming a "runner". Also the UV radical cure does not cure the resin in the edge crack that is covered by the molding. The "dark cure" mechanism of the UV cationic in the repair of an edge crack will cure under the windshield molding.

The oligomer which raises viscosity is what gives the UV cure radical acrylic resin its strength and durability. In typical instances, the multi-viscosity method will use a 1600-2400 cps resin at the edge to fill the gap, 200-400 cps in the middle as the gap begins to close from the lamination stress and 45-90 cps at the point. After this crack has been completely injected with resin any access to oxygen must be removed before curing. This is done by placing a bead of resin on top (surface) of the crack and then Mylar strips on top of this bead to place a barrier to oxygen. (The bead of resin also is to address shrinkage) Then it is cured with the UV light with the tool at the point still in the pressure mode. Then the tool at the point removed, tabbed with Mylar and cured again. The Mylar strips are then removed, the excess resin that was under the Mylar is scrapped off and the Mylar tabs cleaned. The UV radical acrylic resins shrinkage and oxygen inhibition causes more work, more tools, multiple cures and mess. The extra steps also cause the technicians to inevitably get resin on their hands which repeated exposure can lead to skin problems that has caused people to leave the business.

Some edge cracks, such as less than 12 inches long do not have a wide gap and can be repaired with the UV cationic epoxy at a viscosity as low as 100 cps. Then after curing the small amount of excess on the surface is sliced off and that is it. The multiple viscosities, Mylar, multiple cures, shrinkage, scraping and mess have been eliminated.

The Floater Crack Repair

The Floater crack is a crack that does not run to the edge and thus is floating in the middle. This crack is caused by a stone break that was not repaired and the break, usually a star break in the lower bottom of the windshield eventually cracks from temperature change i.e. defroster use. This crack has two point and tools are set up at these two points and the middle is injected by sliding another repair tools over the middle and injecting the crack. The crack is pried open with crack openers on the inside of the windshield and this crack will only take a 90-400 cps resin in the middle and a 45 cps at the points.

Here again once the crack is injected it has to be covered with Mylar to remove access to oxygen to be cured. Then the tools at the point which had to remain on pressure during the first cure to compensate for shrinkage are removed, tabbed with a Mylar strip and then cured ($2^{nd}$ cure). Then the Mylar tabs removed, excess resin scraped off and finally clean the Mylar tabs and windshield.

With the UV cationic epoxy the two injection tools would be set up at the points, and crack openers placed on the inside. Then the injection tools would slide and meet in the middle, then the injection tools are removed and the crack cured once. No Mylar, one less tool and only one cure.

One Viscosity UV Cationic Epoxy Resin or Hybrid in the Entire Crack.

The following process is available with embodiments of the invention using a single viscosity UV cationic or a hybrid of UV cationic and UV radical resin. Access to the point section of a crack is obtained by drilling and tapping a bullseye, applying crack openers, and heating the resin. Drilling and tapping a bullseye is used as an entry access for resin and to help prevent the pressure from the crack opener from spreading the point of the crack. The prior practice in the trade is to use as small a drill bit as possible such as a 171 carbide bit. The technician drills half way through the outerlite and then using a sewing machine needle or carpet needle taps to break it the rest of the way through to the PVB and makes a cone shaped void called a mini-bullseye. This allows pressure to be placed on the innerlite with a crack opener to open the crack and not spread the crack. The bigger this bullseye though the more pressure can be used with the crack opener(s) to pry open the crack without the crack spreading through the bullseye. Drilling and tapping a larger bullseye, using a crack opener 8-inches or longer, two or more crack openers or heating the resin allows mixtures up to 600 cps into the point of the crack.

Optional Second UV Cationic Epoxy in an Edge Crack

Sometimes an edge crack usually longer than 12-14-inches can have a wider gap at the edge. In this case a second epoxy of higher viscosity can be used to fill the gap more easily, not because it is needed for strength like the UV radical resins but to fill the gap without voids or air bubbles in the UV cationic epoxy.

Replace the Mylar

The UV cationic epoxy can eliminate and/or replace the Mylar whether radical or cationic was used in the break or crack. With a stone break repair it replaces the acrylic pit filler and the Mylar and with a crack if it was injected with the UV radical resin the bead on the top can be the UV cationic which will cure under the UV light and prevent access to oxygen to the UV radical resin in the crack. This would save steps, time, mess and waste.

As shown above the UV cationic has many advantages over the UV radical resin in all windshield repair applications. However there is one substantial problem and that is that UV cationic epoxy is contaminated by the PVB interlayer in some manner that prevents polymerization. This same problem also occurs whenever there is moisture present. The following embodiments are directed at solving this problem.

Solving the Contamination by the PVB, Moisture and Humidity.

Cationic polymerization is retarded by the PVB, moisture and humididty. Since the PVB is part moisture and absorbs moisture from the atmosphere, this contamination issue is more problematic to long crack repair then to stone damage repair. The exposure with a stone break to the atmosphere is minimal as the break is un-surfaced and has only the hole from the chip to cause indirect exposure. However rain and car washing can cause a high level of moisture in the break. UV cationic is completely contaminated by moisture in a crack or break and UV radical loses its clarity and most of its strength when exposed to moisture in a crack or break. However when used together as a hybrid there is a great decrease in the effect of moisture on the curing process.

With reference to cracks, the crack is surfaced and is much more exposed as compared to stone breaks. UV cationic by itself for the repair of a long crack will not be successful without: (1) pretreatment; (2) priming; (3) additives or; (4) hybriding with UV radical acrylic resin and/or selected ingredients to compensate for moisture contamination.

Pretreatment—Mechanical drying with a heat gun or blow dryer sometimes worked. For consistency a dry out solution must be injected into a crack and evaporated prior to injecting cationic epoxy into a crack. Dry out solutions such as 99% isopropyl alcohol mixtures; isopropyl alcohol with acrylic acid and isopropyl alcohol with other chemicals and solutions to remove moisture.

Priming—Primers that worked are: acrylic acid; acrylic acid mixed with isopropyl alcohol; Xtra Bond; a blend of absorbent co-polymers and monomers. Xtra Bond is a product marketed by Ultra Bond Inc. which contains isopropyl alcohol, hydrofluoric acid and acrylic acid.

Additives—Acrylic acid can be added to the injector just prior to the repair or mixed with the cationic, but acrylic acid by itself causes crosslinking so it must be used within a short time of mixing or it will gel in the bottle. Acrylic acid can absorb 600 times its weight in moisture. Other additives that do not cause crosslinking while sitting in the bottle is solutions of: co-polymers and monomers, acrylates, methacrylates, hydroxypropyl acrylate+hydroxypropyl methacrylate+acrylic acid; hydrophobic epoxy-siloxane with hydroxy-functional reactive diluents, and adhesion promoters such as organosilanes which also promotes adhesion to glass like the acrylic acid.

Hybrid of UV cationic epoxy and UV radical resin. This is a new technology, virtually not available and is usually customized for a specific application. The mixture of UV cationic epoxy and UV radical acrylic resin solved the contamination problem. In order to keep the mixture with the desirable characteristic of the UV cationic of not being oxygen inhibited the percentage of the UV radical must no greater than 25%. The UV radical content in the hybrid can be higher in which case the crack must then be capped with UV cationic in order to eliminate the Mylar tabs function of removing the oxygen. The UV cationic epoxy replaces the Mylar when the hybrid favors the radical characteristic of oxygen inhibition. The hybride of UV cationic and UV radical is more resistant to moisture than the UV radical is by itself. Another one resin crack repair that works is a 500 cps hybrid-UV radical/epoxy (but not necessarily cationic epoxy) which does not have the shrinkage but is oxygen inhibited, but can be cured with a bead of UV cationic covering the top to remove the oxygen.

In the repair of stone breaks the shrinkage problem is more important than the oxygen inhibition problem This is because the break is unsurfaced and once the windshield repair tool is placed over the impact point the break is cut off from the atmosphere. Therefore the hybrid of the UV cationic and UV radical in such cases can be higher than 25% UV radical. Also and pit filling with the UV cationic will cut off oxygen during curing.

Tests for Oxygen Inhibition with Cationic/Radical Hybrids and Other Mixtures:

The following tests were to determine the effects of various mixtures and hybrids on the oxygen inhibition characteristic of the UV cationic epoxy. In all of the following the percentages were determined by counting drops of the materials using a controlled tip, which is regarded as volume percentages for the present purposes. In each case the mixture or hybrid was applied to glass and cured and the result observed for the effect if any of oxygen inhibition. A smooth hard surface is considered free of oxygen inhibition effects as contrasted with a sticky surface.

Mixtures of acrylic acid with UV cationic were applied on a glass surface. Mixtures were tried with several amounts of acrylic acid including 1%, 10%, 20%, 30%, 40% and 50% acrylic acid to UV cationic. At 1% to 50% the results were good cohesiveness and the absence of oxygen inhibition and good bonding to the glass. The results were clear and smooth. Over 50% acrylic acid, the mixture lost cohesiveness after curing.

The tests and results are described below.
1. A hybrid of 20% at 45 cps UV radical to 80% UV cationic in a range of viscosities from 70 cps to 600 cps using, 70, 100. 1560, 250, 450 and 600 were applied on a glass surface. There was good bonding to the glass and absence of stickiness, no oxygen inhibition.
2. A hybrid of 25% at 45 cps UV radical to 75% UV cationic, using the same 70-600 cps range were applied on a glass surface. The result was good bonding to the glass but some slight results of oxygen inhibition were seen, smooth and a little bit sticky.
3. A hybrid of 30% at 45 cps UV radical, applied on a glass surface showed signs of oxygen inhibition
4. Hybrid of UV cationic and 1600 cps UV radical at 10% and 20% applied on a glass surface had a good result with no oxygen inhibition effects observed.
5. Hybrid of 90% UV cationic and 10% 2-hydroxypropyl acrylate cured and bonded well to a glass surface with no oxygen inhibition effects observed.
6. Hybrid of 90% UV cationic and 10% 2-hydroxypropyl methacrylate cured and bonded well to a glass surface with no oxygen inhibition effects observed.
7. Hybrid of 90% UV cationic and 10% of a mixture of 2-hydroxypropyl acrylate and methacrylate (at 50:50 mixture) cured and bonded well to a glass surface with no oxygen inhibition effects observed.
8. Hybrid of 90% UV cationic and 10% of a mixture of acrylates, methacrylates and acrylic acid (at ⅓ each) cured and bonded well to a glass surface with no oxygen inhibition effects observed.
9. Repaired a 12-inch edge crack in a customer's windshield using 300 cps and another repair using 400 cps UV cationic, primed the entire crack first with acrylic acid. The result was a good smooth hard cure and bonded well to the glass with no oxygen inhibition effects observed. Results looked as good as the prior art multiple viscosity radical method (see U.S. Pat. Nos. 5,116,441, 5,425,827, and 5,429,692).

Tests for Winter Time Moisture and Temperature Change:

In these tests, combination breaks were repaired inside and then left outside for 2 days during winter in Grand Junction, Colo. during which time there was snowfall and the temperature dropped to 0 F. at night. The repairs were done in the normal combination break procedure which includes a vacuum step, pressure step, and pressure continued during curing. In each case, good repairs were obtained. For the observations, loose snow was removed and a heat gun was used to heat the treated area to about 150 F. The results were examined with a microscopic lens.

10. Combination break with extended cracks repaired with UV cationic at 70 cps. No change in the condition of the repair was observed from the weathering exposure.
11. Combination break with extended cracks repaired with UV cationic at 250 cps. In this test, the break was exposed to water prior to the repair. No change in the condition of the repair was observed from the weathering exposure.
12. Combination break with extended cracks repaired with a hybrid of UV cationic and UV radical. In this test, the break was exposed to water prior to the repair. No change in the condition of the repair was observed from the weathering exposure.

Tests on Outside of Glass

In these test mixture were used and applied to a glass surface and cured; then the sample was left outside for about a week in Grand Junction, Colo. during the winter. In each test, the sample was clear, hard and smooth.

13. A hybrid of 90% of UV cationic at 300 cps and 10% of 2-hydroxypropyl acrylate. No change was observed after the exposure to weathering.
14. A hybrid of 90% of UV cationic at 300 cps and 10% of 2-hydroxypropyl methacrylate. No change was observed after the exposure to weathering.
15. A hybrid of 90% of UV cationic at 300 cps and 10% of a UV radical at 1600 cps. No change was observed after the exposure to weathering.
16. A hybrid of 90% of UV cationic at 200 cps and 20% of a UV radical at 1600 cps. No change was observed after the exposure to weathering.

Other Examples and Conclusions:
17. UV cationic with about 5% to 20% acrylic acid worked for stone breaks with water in the break, did not discolor or turn white and successfully bonded the break.
18. UV cationic and HDODA (Hexanediol Diacrylate) did not bond to the glass.
19. Repaired a 7-inch crack in customer's windshield using a mixture of isopropyl alcohol and acrylic acid as a primer, then repaired with a 250 cps UV cationic. The repair was successful and not contaminated by PVB.
20. A crack repair with a mixture of UV cationic and 1% acrylic acid worked in a crack repair showing no sign of contamination by PVB.
21. A mixture of UV cationic with acrylic acid worked for stone breaks with water in the break. Samples sat outside for about a month during winter in Grand Junction, Colo.
22. A hybrid of 80% of UV cationic at 70 cps mixed with 20% of UV radical with no acrylic acid was put on a glass surface and provided a good cure with no oxygen inhibition effects. At 30% and 40% of UV radical it cured sticky. However with the same mixture of 30% and 40% of UV radical capping the top with the UV cationic cured smooth and hard with no oxygen inhibition effects. Therefore the UV cationic capping can be used in place of the Mylar with a UV cationic and UV radical hybrid when the mix is favoring an oxygen inhibition effect.
23. A hybrid of 75% UV cationic at 400 cps and 25% UV radical at 45 cps was applied in a crack in a laminated glass. Samples sat outside for about three months during winter in Grand Junction, Colo. The repair was initially good and remained good after the exposure.
24. Used epoxy and epoxy hybrids to cure UV radical cure acrylics by capping with the epoxy in place of the Mylar. These worked with both the hybrid and the acrylic radical cure. Therefore, in cases of repairs in which a Mylar strip is required to prevent oxygen inhibition capping with a UV cationic curing epoxy or a hybrid that cures cationic can eliminate the need for a Mylar strip to avoid oxygen inhibition.

Mixtures and Test Results:
Made edge cracks in the sides of un-installed windshields and repaired them as described below. The windshields were placed outside for exposure during winter in Grand Junction, Colo. The bond integrity was treated using steel crack openers with a two-inch nylon bolt for the pressure point to break the bond. The first test (test 1) was with an eight-inch bar with two-inch 40 durometer suction cups. The second test (test 2) was with a ten-inch bar with two-inch 50 durometer suction cups. The third test (test 3) was with a ten-inch bar with 3-inch 60 durometer suction cups. Those that pass with a ten-inch bar with two-inch suction cups are successful for long term duration in a long crack. Those that pass with the three-inch suction cups are also successful for long term duration in a long crack but are superior in that the glass will break before the bond. The hybrids passed test 2. The UV cationic primed with isopropyl alcohol and acrylic acid and primed with Xtra Bond, all passed test 3.
25. A hybrid of UV cationic at 450 cps mixed with 2-hydroxypropyl acrylate, 2-hydroxypropyl methacrylate and acrylic acid was clear. It passed test 2 and failed test 3.
26. A hybrid of 70% of UV cationic at 100 cps mixed with 30% of UV radical at 400 cps did was clear and did not leave a void in the bullseye. It passed test 2 and failed test 3.
27. A hybrid of UV cationic at 70, 100, 250, 450 and 600 cps by itself had voids and refraction and failed test 1.
28. UV cationic at 600 cps primed with Xtra Bond was clear. It passed test 3.
29. A hybrid of 90% of UV cationic at 100 cps with 10% of UV radical at 1600 cps cured cationic. It passed test 2.
30. A hybrid of 60% of UV cationic at 600 cps with 40% of UV radical at 45 cps. It passed test 2.
31. A hybrid of 80% of UV cationic at 250 cps mixed with 20% of UV radical at 45 cps. It passed test 2 and failed test 3.
32. UV cationic at 75 cps dried mechanically with hair dryer. It passed test 2 and failed test 3.
33. A hybrid of 70% of UV cationic at 70 cps mixed with 30% UV radical at 400 cps.
It passed test 2 and failed test 3.
34. UV cationic at 250 cps primed with Xtra Bond was clear. It passed test 3.
35. UV cationic at 70 cps primed with Xtra Bond was clear. It passed test 2 and failed test 3.
36. UV cationic at 200 cps primed with isopropyl alcohol and acrylic acid. It passed test 3.
37. UV cationic at 200 cps primed with Xtra Bond. It passed test 3.
38. UV cationic at 150 cps primed with isopropyl alcohol and acrylic acid. It passed test 3.
39. UV cationic at 150 cps primed with Xtra Bond. It passed test 3.

UV cationic from 70 cps-600 cps did not spot (refraction is present) when pre-treated or primed with isopropyl alcohol and acrylic acid mixtures. Same with Xtra Bond for a pre-treatment/primer/adhesion promoter. 150 cps and above passed test 3.

Stone Damage Tests
40. A mixture was made of 2-hydroxypropyl acrylate, 2-hydroxypropyl methacrylate and acrylic acid (the test subjects) at ⅓ each and a drop was placed in the injector so as to be injected first. Several tests were performed with different resin protocols in a stone break with water in the break. In one test, only UV cationic epoxy was used. In another test, a hybrid of 80% of UV cationic and 20% of UV radical was used. In another test, a UV radical was used alone. In each test a stone break with water in the break was repaired. In all of the tests the repair was clear and did not spread with pressure applied on the break. Then a test was done on a glass surface in which each of the chemicals (the test subjects) was used alone in each of the above combinations of epoxy resins with a drop of water. In each test they cured foggy. Then another test was tried in which the three test subjects were mixed together, again with each of the above combinations of epoxy resins and with a drop of water in the mixture on a glass surface. The results were clear and established that use of the three test subjects together will render any windshield repair resin immune from the effects of water to spoil the repair. The preferred procedure is to place one drop consisting of the three test subjects into the injector to be injected first or on the impact point just prior to doing a repair.

Repairs on Customers' Vehicles:
41. Repaired a 24-inch edge crack in customer's Toyota on Feb. 2, 2009, invoice number 10492. This repair used two mixtures, one in the edge area and the second the balance of the crack as taught in the prior patents referred to above for repair of edge cracks. First in the edge area a hybrid of 80% UV cationic at 200 cps and 20% UV radical at 1600 cps. Then in the balance of the crack a hybrid of low viscosity of 80% of UV cationic at 70 cps and 20% of UV radical at 45 cps. After repair there were a few tiny spots on the (top) surface. In the prior art a bead of resin was required to be put over the repair before curing. In this case, a bead was not applied. On Feb. 17, 2009 the repair was inspected at customer's home. The vehicle was not garaged and they lived on a river. The repair was spotless. The few tiny spots that were there immediately after repair had disappeared from the post cure and expanding effect of the UV cationic.

42. Repaired a 14-inch crack with a hybrid of 80% of UV cationic at 200 cps and 20% of UV radical at 400 cps on Jan. 20, 2009. On Feb. 7, 2009 the customer reported that the repair was still clear.

43. Repaired combination break with UV cationic at 250 cps on Dec. 12, 2008. A month later the repair was inspected and was still perfect.

44. Repaired three star breaks on one windshield with UV cationic at 70 cps on Jan. 21, 2009. A month later the repair was inspected and was still perfect. In this case the vehicle was not garaged.

45. Repaired 7-inch edge crack on Feb. 27, 2009 with UV cationic at 250 cps. The crack was pretreated with Xtra Bond. The results were good, no spots.

Shrinkage Comparisons:

46. Experience over a long period of time had indicated that using UV radical at 200 cps in edge cracks resulted in shrinkage in the point, in the bullseye and in the edge area. As indicated in test results above, use of 70, 100, 150, 200, 250, 300 450, and 600 cps UV cationic pretreated, primed, mixed, and hybrid with about 5%-40% of UV radical did not show shrinkage.

Oxygen Inhibition:

From the foregoing tests it can be seen that in a hybrid of UV cationic and low viscosity UV radical with and without acrylic acid, oxygen inhibition occurs at over 25% of UV radical.

All oxygen inhibited mixtures and straight UV radical cured by using the UV cationic to remove the oxygen. The UV cationic can replace Mylar with UV radical curing resins. In all cases in which oxygen inhibition occurs, a bead of UV cationic can replace use of a Mylar strip to eliminate the oxygen inhibition in curing of the repair.

The foregoing Detailed Description of exemplary and preferred embodiments is presented for purposes of illustration and disclosure in accordance with the requirements of the law. It is not intended to be exhaustive nor to limit the invention to the precise form or forms described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising step(s) for . . . ."

The invention claimed is:

1. A method of repairing a long crack in a windshield comprising introducing a repair material into the crack comprising a UV curing cationic epoxy and wherein the crack is pre-treated by applying into the crack a moisture removing solvent or acrylic acid thereby to sufficiently negate retardation of curing of the UV curing cationic epoxy by moisture in the crack and by a PVB laminate interlayer of the windshield whereby bonding of the epoxy to the PVB is promoted.

2. A method of repairing a long crack in a windshield of a type having a PVB laminate interlayer, comprising introducing a repair material into the crack comprising a UV curing cationic epoxy and wherein the crack is primed before introduction of the UV curing cationic epoxy by applying into the crack a moisture removing solvent or acrylic acid thereby sufficiently to negate retardation of curing of the epoxy caused by moisture in the crack and by the PVB laminate interlayer of the windshield thereby to promote bonding of the epoxy to the PVB.

3. A method of repairing a stone break in a windshield comprising inserting into the break a mixture of 2-hydroxypropyl acrylate, 2-hydroxypropyl methacrylate and acrylic acid to neutralize water or moisture in the break.

* * * * *